US010422882B1

(12) United States Patent
Wang et al.

(10) Patent No.: US 10,422,882 B1
(45) Date of Patent: Sep. 24, 2019

(54) ARAIM SUBSET SELECTION METHOD AND SYSTEM BASED ON BEIDOU CONSTELLATION

(71) Applicant: Beihang University, Beijing (CN)

(72) Inventors: Zhipeng Wang, Beijing (CN); Chuang Shi, Beijing (CN); Tinglin Li, Beijing (CN)

(73) Assignee: BEIHANG UNIVERSITY, Beijing (CN)

(*) Notice: Subject to any disclaimer, the term of this patent is extended or adjusted under 35 U.S.C. 154(b) by 0 days.

(21) Appl. No.: 16/220,458

(22) Filed: Dec. 14, 2018

(30) Foreign Application Priority Data

Nov. 2, 2018 (CN) .......................... 2018 1 1295524

(51) Int. Cl.
*G01S 19/20* (2010.01)
*G06F 17/18* (2006.01)
*G01S 19/25* (2010.01)
*G01S 19/06* (2010.01)

(52) U.S. Cl.
CPC .............. *G01S 19/20* (2013.01); *G01S 19/06* (2013.01); *G01S 19/258* (2013.01); *G06F 17/18* (2013.01)

(58) Field of Classification Search
CPC ........ G01S 19/20; G01S 19/06; G01S 19/258; G06F 17/18

USPC ..................................................... 342/357.58
See application file for complete search history.

(56) References Cited

U.S. PATENT DOCUMENTS

2013/0154879 A1* 6/2013 Ramakrishnan ........ G01S 19/20
 342/357.25
2018/0081064 A1* 3/2018 Skalicky ................. G01S 19/20

* cited by examiner

*Primary Examiner* — Harry K Liu
(74) *Attorney, Agent, or Firm* — Locke Lord LLP; Tim Tingkang Xia, Esq.

(57) ABSTRACT

An ARAIM subset selection method based on a BeiDou constellation includes: (a) deeming a current airspace as a two-dimensional plane and satellite distribution at some point as point distribution on the two-dimensional plane; (b) selecting coordinates of K satellites as original centroids, assigning each satellite to the closest original centroid by means of a K-Means algorithm to form K classification clusters, and recalculating a centroid of each classification cluster to obtain a centroid coordinate; (c) re-selecting the coordinates of the K satellites as the original centroids, repeating the calculation step (b) to calculate the sum of squared errors of the centroid obtained every time, and selecting the centroid with a minimum sum of squared errors as an output result; and (d) performing outlier detection on the output result of the step (c), and if an outlier appears, not performing fault assumption on a satellite at the outlier.

1 Claim, 5 Drawing Sheets

ARAIM SUBSET SELECTION METHOD AND SYSTEM BASED ON BEIDOU CONSTELLATION

CROSS-REFERENCE TO RELATED PATENT APPLICATION

This non-provisional application claims priority to and the benefit of, pursuant to 35 U.S.C. § 119(a), patent application Serial No. CN 201811295524.2 filed in China on Nov. 2, 2018. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to the technical field of satellite navigation, and in particular to an ARAIM subset selection method and system based on a BeiDou constellation.

BACKGROUND

The GNSS (Global Navigation Satellite System) technology can provide stable and accurate location information for users around the world and has been widely used in the aviation field. The users mainly need the following navigation performance indicators during use of global satellite navigation: accuracy, integrity, continuity and availability. RAIM (Receiver Autonomous Integrity Monitoring) can provide service for horizontal navigation in an approach phase of an aircraft. ARAIM (Advanced Receiver Autonomous Integrity Monitoring) is a new generation of satellite navigation integrity monitoring technology that extends the conventional RAIM. ARAIM uses multiple GNSS constellations and dual frequencies, has a multi-fault monitoring capability, and therefore, can support vertical navigation below the height of 200 feet (LPV-200). In order to achieve this goal, an aeronautical receiver needs to consider possible failures of each satellite. The computational load is increased while satellite subsets are selected according to this rule. Before use of satellite navigation, a user should predict the availability of an ARAIM algorithm. Satellite navigation is used when ARAIM meets required availability demands, otherwise, satellite navigation is abandoned, and other navigation devices are used.

Satellites of a BeiDou constellation have the characteristics of a hybrid orbit. After completing global networking, the BeiDou constellation will consist of 35 satellites, including 5 GEO (Geostationary Orbit) satellites, 3 IGSO (Inclined Geosynchronous Satellite Orbit) satellites, and 27 MEO (Medium Earth Orbit) satellites. For users in the Asia-Pacific region, the current BeiDou regional constellation is non-uniform and more concentrated in constellation configuration. Therefore, during fault assumption of the satellites, if fault situations of all the BeiDou satellites are considered on average, it is bound to cause that some extreme assumptions greatly impact analysis results and even make the analysis results unavailable.

Thus, in order to solve the above problems in the prior art, an ARAIM subset selection method and system based on a BeiDou constellation are required to modify a subset of the BeiDou constellation for better availability prediction.

SUMMARY

One aspect of the present invention is to provide an ARAIM subset selection method based on a BeiDou constellation, comprising:

(a) deeming a current airspace as a two-dimensional plane and satellite distribution at some point as point distribution on the two-dimensional plane;

(b) selecting coordinates of K satellites as original centroids, assigning each satellite to the closest original centroid by means of a K-Means algorithm to form K classification clusters, and recalculating a centroid of each classification cluster till each cluster is unchanged or reaches a maximum iteration to obtain a centroid coordinate;

(c) re-selecting the coordinates of the K satellites as the original centroids, repeating the calculation step (b) to calculate the sum of squared errors of the centroid obtained every time, and selecting the centroid with a minimum sum of squared errors as an output result; and (d) performing outlier detection on the output result of the step (c), if no outlier appears, not modifying a satellite subset and if an outlier appears, not performing fault assumption on a satellite at the outlier.

Preferably, the sum of squared errors of the centroid is calculated according to the following formula:

$$SSE = \sum_{i=1}^{K} \sum_{x \in C_i} dist(c_i, x)^2,$$

wherein c is the location of the centroid, i is the serial number of the satellite, x is the location of the satellite, dist is a Euclidean distance between the location c of the centroid and the location of the satellite, and K is the number of the classification clusters.

Yet another aspect of the present invention is to provide a an ARAIM subset selection method based on a BeiDou constellation, comprising:

(a) deeming a current airspace as a two-dimensional plane and satellite distribution at some point as point distribution on the two-dimensional plane;

(b) selecting coordinates of K satellites as original centroids, assigning each satellite to the closest original centroid by means of a K-Means algorithm to form K classification clusters, and recalculating a centroid of each classification cluster till each cluster is unchanged or reaches a maximum iteration to obtain a centroid coordinate;

(c) re-selecting the coordinates of the K satellites as the original centroids, repeating the calculation step (b) to calculate the sum of squared errors of the centroid obtained every time, and selecting the centroid with a minimum sum of squared errors as an output result;

(d) selecting the centroids of two classification clusters output in the step (c) to calculate a cosine distance $A_2$=cos θ, wherein, when the cosine distance $A_2$>−0.866, considering that azimuth configuration is worse, entering step (e), otherwise, selecting the centroids of three classification clusters to calculate a cosine distance $A_{3_n}$, n=1, 2, 3;

when min($A_{3_n}$)<−0.866 or max($A_{3_n}$)>0, considering that azimuth configuration is worse, entering the step (e), otherwise, selecting the centroids of three classification clusters to calculate a cosine distance $A_{4_n}$, n=1, 2, 3; and when max(|$A_{4_n}$|)>0.5, considering that azimuth configuration is worse, and entering step (e);

(e) dividing the current airspace by a 30-degree azimuth, sequentially retrieving all regions, performing fault assumption on one of two or more BeiDou satellites that appear in a certain region but not other satellites, calculating a constellation configuration factor $SDOP_n$ (n=1, 2, . . . ) of the satellite on which the fault assumption is performed in each region, and selecting a subset excluded in the corresponding region when GDOP is minimum as a satellite subset; and (f) retrieving again, and when a visible satellite does not appear in two or more consecutive regions, not performing fault assumption on the satellites of two regions which are adjacent to a big region formed by connecting the two or more consecutive regions that have no visible satellites, and when the visible satellite appears in only the middle one of three consecutive regions, not performing fault assumption on the satellite in the middle region.

Preferably, the sum of squared errors of the centroid being calculated according to the following formula:

$$SSE = \sum_{i=1}^{K} \sum_{x \in C_i} dist(c_i, x)^2,$$

wherein c is the location of the centroid, i is the serial number of the satellite, x is the location of the satellite, dist is a Euclidean distance between the location c of the centroid and the location of the satellite, and K is the number of the classification clusters.

Preferably, the cosine distance between the centroids of the two classification clusters is calculated according to the following formula:

$$\cos\theta = \frac{x_1 x_2 + y_1 y_2}{\sqrt{x_1^2 + x_2^2}\sqrt{y_1^2 + y_2^2}},$$

wherein $x_1$, $y_1$, $x_2$ and $y_2$ are horizontal coordinates and vertical coordinates of the centroids of the two classification clusters in a current two-dimensional airspace plane.

Yet another aspect of the present invention is to provide an ARAIM subset selection method based on a BeiDou constellation, comprising:

(a) dividing an airspace into three regions by a 30-degree elevation, and performing one-time satellite location data sampling every hour to count the average numbers L, M and H of visible satellites in a low-elevation region, a medium-elevation region and a high-elevation region within total time;

(b) subtracting the average numbers of satellites in the corresponding regions from the number of satellites, obtained through each sampling, in the three regions to obtain $L_n$, $M_n$, $H_n$, (n=1, 2, . . . ); and (c) defining an elevation configuration factor $N_{d_n}=H_n-L_n$,
when $N_{d_n}>0$, $M_n>0$, not modifying a satellite subset;
when $N_{d_n}>0$, $M_n<0$, not modifying the satellite subset;

when $N_{d_n}<0$, $M_n>0$, calculating $M_n+N_{d_n}$, not modifying the satellite subset if $M_n+N_{d_n}>0$, and otherwise, modifying the satellite subset; and when $N_{d_n}<0$, $M_n<0$, modifying the satellite subset.

Yet another aspect of the prevent invention is to provide an ARAIM subset selection system based on a BeiDou constellation, comprising the BeiDou constellation and an aircraft. The BeiDou constellation comprises 35 satellites. The aircraft comprises a signal receiving antenna and a data processor. The signal receiving antenna receives a signal sent by the BeiDou satellite and sends the received signal to the data processor for ARAIM subset selection. The data processor performs subset selection by the following steps:

(a) deeming a current airspace as a two-dimensional plane and satellite distribution at some point as point distribution on the two-dimensional plane;

(b) selecting coordinates of K satellites as original centroids, assigning each satellite to the closest original centroid by means of a K-Means algorithm to form K classification clusters, and recalculating a centroid of each classification cluster till each cluster is unchanged or reaches a maximum iteration to obtain a centroid coordinate;

(c) re-selecting the coordinates of the K satellites as the original centroids, repeating the calculation step (b) to calculate the sum of squared errors of the centroid obtained every time, and selecting the centroid with a minimum sum of squared errors as an output result; and (d) performing outlier detection on the output result of the step (c), if no outlier appears, not modifying a satellite subset, and if an outlier appears, not performing fault assumption on a satellite at the outlier.

Yet another aspect of the present invention is to provide an ARAIM subset selection system based on a BeiDou constellation, comprising the BeiDou constellation and an aircraft. The BeiDou constellation comprises 35 satellites. The aircraft comprises a signal receiving antenna and a data processor. The signal receiving antenna receives a signal sent by the BeiDou satellite and sends the received signal to the data processor for ARAIM subset selection. The data processor performs subset selection by the following steps:

(a) deeming a current airspace as a two-dimensional plane and satellite distribution at some point as point distribution on the two-dimensional plane;

(b) selecting coordinates of K satellites as original centroids, assigning each satellite to the closest original centroid by means of a K-Means algorithm to form K classification clusters, and recalculating a centroid of each classification cluster till each cluster is unchanged or reaches a maximum iteration to obtain a centroid coordinate;

(c) re-selecting the coordinates of the K satellites as the original centroids, repeating the calculation step (b) to calculate the sum of squared errors of the centroid obtained every time, and selecting the centroid with a minimum sum of squared errors as an output result;

(d) selecting the centroids of two classification clusters output in the step (c) to calculate a cosine distance $A_2$=cos θ, wherein, when the cosine distance $A_2>−0.866$, considering that azimuth configuration is worse, entering step (e), otherwise, selecting the centroids of three classification clusters to calculate a cosine distance $A_{3_n}$, n=1, 2, 3;

when min($A_{3_n}$)<−0.866 or max($A_{3_n}$)>0, considering that azimuth configuration is worse, entering the step (e), otherwise, selecting the centroids of three classification clusters to calculate a cosine distance $A_{4_n}$, n=1, 2, 3; and when max(|$A_{4_n}$|)>0.5, considering that azimuth configuration is worse, and entering step (e);

(e) dividing the current airspace by a 30-degree azimuth, sequentially retrieving all regions, performing fault assumption on one of two or more BeiDou satellites that appear in a certain region but not other satellites, calculating a constellation configuration factor $SDOP_n$ (n=1, 2, . . . ) of the satellite on which the fault assumption is performed in each region, and selecting a subset excluded by the corresponding region when GDOP is minimum as a satellite subset; and (f) retrieving again, and when a visible satellite does not appear in two or more consecutive regions, not performing fault assumption on the satellites of two regions which are adjacent to a big region formed by connecting the two or more consecutive regions that have no visible satellites, and when the visible satellite appears in only the middle one of three consecutive regions, not performing fault assumption on the satellite in the middle region.

Yet another aspect of the present invention is to provide an ARAIM subset selection system based on a BeiDou constellation, comprising the BeiDou constellation and an aircraft. The BeiDou constellation comprises 35 satellites. The aircraft comprises a signal receiving antenna and a data processor. The signal receiving antenna receives a signal sent by the BeiDou satellite and sends the received signal to the data processor for ARAIM subset selection. The data processor performs subset selection by the following steps:

(a) dividing an airspace into three regions by a 30-degree elevation, and performing one-time satellite location data sampling every hour to count the average numbers L, M and H of visible satellites in a low-elevation region, a medium-elevation region and a high-elevation region within total time;

(b) subtracting the average numbers of satellites in the corresponding regions from the number of satellites, obtained through each sampling, in the three regions to obtain $L_n$, $M_n$, $H_n$, (n=1, 2, . . . ); and (c) defining an elevation configuration factor $N_{d_n}=H_n-L_n$, when $N_{d_n}>0, M_n>0$, not modifying a satellite subset;

when $N_{d_n}>0, M_n<0$, not modifying the satellite subset;

when $N_{d_n}<0, M_n>0$, calculating $M_n+N_{d_n}$, not modifying the satellite subset if $M_n+N_{d_n}>0$, and otherwise, modifying the satellite subset; and when $N_{d_n}<0, M_n<0$, modifying the satellite subset.

Before subset selection, the current BeiDou constellation configuration is analyzed. Choice and modification are further made during subset selection in two aspects of azimuth and elevation. The satellites not requiring fault assumption are removed, so that the impact on constellation configuration from fault assumption of the satellites is minimized. Thus, the computational load of the data processor is reduced while the availability prediction is guaranteed.

It should be understood that the foregoing general description and the follow-up detailed description are both exemplary illustrations and explanations, and neither of the two should be used as a limitation to the content claimed by the present invention.

BRIEF DESCRIPTION OF THE DRAWINGS

With reference to the accompanying drawings, more objectives, functions and advantages of the present invention will be made apparent by the following description of embodiments of the present invention.

DETAILED DESCRIPTION

Figure 1:
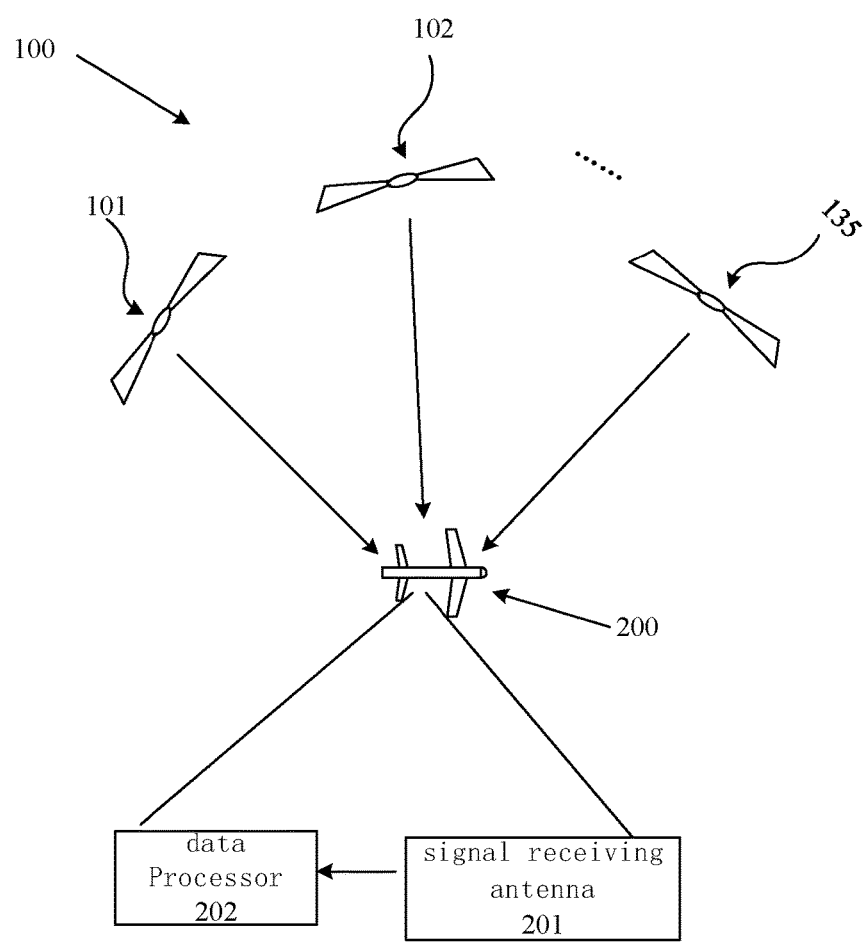
FIG. 1 illustrates a structural schematic view of an ARAIM subset selection system based on a BeiDou constellation according to one embodiment of the present invention.

Objectives and functions of the present invention and methods for achieving the objectives and functions will be clarified with reference to exemplary embodiments. However, the present invention is not limited to the exemplary embodiments disclosed below, and can be implemented in various forms. The essence of the description is merely to help those skilled in the relevant art to understand specific details of the present invention.

Hereinafter, the embodiments of the present invention will be described with reference to the drawings, and related technical terms should be well known to those skilled in the art. The same reference signs in the drawings represent the same or similar parts, or the same or similar steps, unless otherwise stated. To explain the present invention more clearly, the content of the present invention will be described below by way of specific embodiments.

An aircraft (e.g., a civil aircraft) receives signals of multiple satellites of a BeiDou constellation, performs fault assumption and availability analysis on the different satellites, removes the satellites that may not be used for navigation, and builds an ARAIM subset with the available satellites to form BeiDou constellation configuration for navigation. In the present invention, the current BeiDou constellation configuration is analyzed. Choice and modification are further made during subset selection in two aspects of azimuth and elevation. The satellites not requiring fault assumption are removed, so that the impact on the constellation configuration from fault assumption of the satellites is minimized.

Embodiment 1

According to this embodiment of the present invention, only coarse modification of azimuth configuration is inspected, and satellites not requiring fault assumption are removed by an outlier detection method. To make the content of the present invention more clearly explained, an ARAIM subset selection system based on a BeiDou constellation, provided by the present invention, is described first. FIG. 1 illustrates a structural schematic view of an ARAIM subset selection system based on a BeiDou constellation according to one embodiment of the present invention. The ARAIM subset selection system based on the BeiDou constellation comprises the BeiDou constellation 100 and an aircraft 200. The BeiDou constellation 100 comprises 35 satellites (satellite 101, satellite 102 . . . satellite 135). The aircraft 200 comprises a signal receiving antenna 201 and a data processor 202. The signal receiving antenna 201 receives a signal sent by the BeiDou satellite and sends the received signal to the data processor 202 for ARAIM subset selection according to a location coordinate of the satellite. The data processor performs subset selection by the following steps:

(a) deeming a current airspace as a two-dimensional plane and satellite distribution at some point as point distribution on the two-dimensional plane;

(b) selecting coordinates of K satellites as original centroids, assigning each satellite to the closest original centroid by means of a K-Means algorithm to form K classification clusters, and recalculating a centroid of each classification cluster till each cluster is unchanged or reaches a maximum iteration to obtain a centroid coordinate;

(c) re-selecting the coordinates of the K satellites as the original centroids, repeating the calculation step (b) to calculate the sum of squared errors of the centroid obtained every time, and selecting the centroid with a minimum sum of squared errors as an output result; and (d) performing outlier detection on the output result of the step (c), if no outlier appears, not modifying a satellite subset and if an outlier appears, not performing fault assumption on a satellite at the outlier. The satellites on which fault assumption is performed are excluded when an ARAIM algorithm is utilized for availability prediction.

The outlier means that only one satellite exists in a big region. If fault assumption is normally performed on the satellite, an extreme analysis result may be caused. Since the outlier is significantly different from other satellites, fault assumption is not performed on this satellite. This satellite needs to be reserved.

Figure 2:
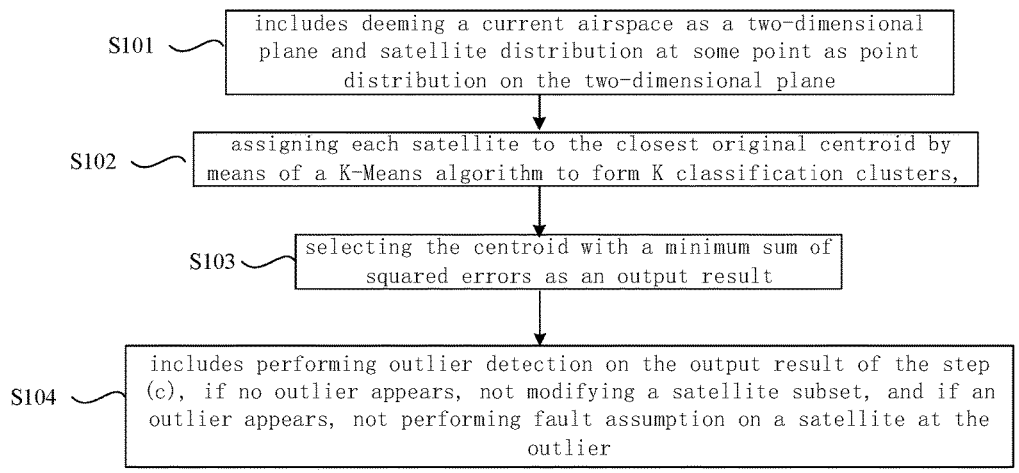
FIG. 2 illustrates a flow chart of an ARAIM subset selection method based on a BeiDou constellation according to one embodiment of the present invention.

FIG. 2 illustrates a flow chart of an ARAIM subset selection method based on a BeiDou constellation according to one embodiment of the present invention. The ARAIM subset selection method based on the BeiDou constellation comprises the following steps.

S101 includes deeming a current airspace as a two-dimensional plane and satellite distribution at some point as point distribution on the two-dimensional plane;

S102 includes selecting coordinates of K satellites as original centroids, assigning each satellite to the closest original centroid by means of a K-Means algorithm to form K classification clusters, and recalculating a centroid of each classification cluster till each cluster is unchanged or reaches a maximum iteration to obtain a centroid coordinate;

S103 includes re-selecting the coordinates of the K satellites as the original centroids, repeating the calculation step S102 to calculate the sum of squared errors of the centroid obtained every time, and selecting the centroid with a minimum sum of squared errors as an output result.

The sum of squared errors of the centroid is calculated according to the following formula:

$$SSE = \sum_{i=1}^{K} \sum_{x \in C_i} dist(c_i, x)^2,$$

wherein c is the location of the centroid, i is the serial number of the satellite, x is the location of the satellite, dist is a Euclidean distance between the location c of the centroid and the location of the satellite, and K is the number of the classification clusters.

S104 includes performing outlier detection on the output result of the step (c), if no outlier appears, not modifying a satellite subset, and if an outlier appears, not performing fault assumption on a satellite at the outlier.

In the above process, the outlier detection is a process for finding out an object (satellite) of which the behavior is much different from that expected. This object is called an outlier. Outlier detection and cluster analysis are two highly correlated tasks. Through cluster analysis, most modes in a data set are discovered and data are organized accordingly. Outlier detection attempts to capture abnormalities that obviously deviate from the most modes. The outlier is significantly different from other objects (satellites).

In some embodiments, a method for detecting an outlier by clustering is to discard small clusters away from other clusters. This process may be simplified as discarding of all clusters smaller than a certain minimum threshold.

In some other embodiments, all the objects are clustered first, and then, the extent to which the objects belong to a cluster is evaluated according to the distance between the objects and the center of their cluster. If the objective is remarkably improved by deleting one object, the object may be deemed as the outlier. For example, in a K average algorithm, the sum of squared errors of the cluster may be remarkably improved by deleting an object away from the center of its relevant cluster. It should be understood that the above-mentioned outlier detection may be other methods mastered by those skilled in the art, which will not be limited specifically in the present invention.

Embodiment 2

This embodiment only considers fine modification of azimuth configuration and differs from embodiment 1 in that a centroid with a minimum sum of squared errors is output and satellites not requiring fault assumption are screened out through a cosine distance.

Figure 3:
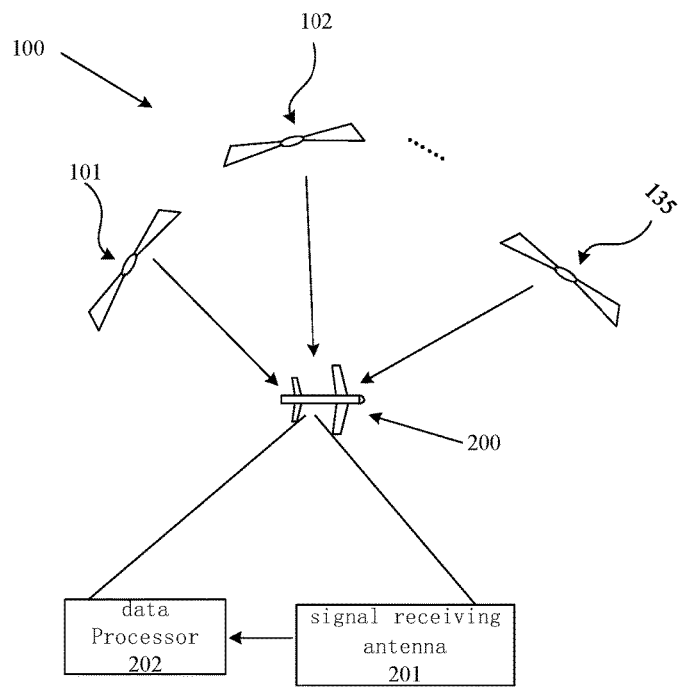
FIG. 3 illustrates a structural schematic view of an ARAIM subset selection system based on a BeiDou constellation according to yet another embodiment of the present invention.

To make the content of the present invention more clearly explained, an ARAIM subset selection system based on a BeiDou constellation, provided by the present invention, is described. FIG. 3 illustrates a structural schematic view of an ARAIM subset selection system based on a BeiDou constellation according to yet another embodiment of the present invention. The ARAIM subset selection system based on the BeiDou constellation comprises the BeiDou constellation 100 and an aircraft 200. The BeiDou constellation 100 comprises 35 satellites (satellite 101, satellite 102 . . . satellite 135). The aircraft 200 comprises a signal receiving antenna 201 and a data processor 202. The signal receiving antenna 201 receives a signal sent by the BeiDou satellite and sends the received signal to the data processor 202 for ARAIM subset selection according to a location coordinate of the satellite. The data processor performs subset selection by the following steps:

(a) deeming a current airspace as a two-dimensional plane and satellite distribution at some point as point distribution on the two-dimensional plane;

(b) selecting coordinates of K satellites as original centroids, assigning each satellite to the closest original centroid by means of a K-Means algorithm to form K classification clusters, recalculating a centroid of each classification cluster till each cluster is unchanged or reaches a maximum iteration to obtain a centroid coordinate;

(c) re-selecting the coordinates of the K satellites as the original centroids, repeating the calculation step (b) to calculate the sum of squared errors of the centroid obtained every time, and selecting the centroid with a minimum sum of squared errors as an output result;

(d) selecting the centroids of two classification clusters output in the step (c) to calculate a cosine distance $A_2$=cos θ, wherein, when the cosine distance $A_2$>-0.866, considering that azimuth configuration is worse, entering step (e), otherwise, selecting the centroids of three classification clusters to calculate a cosine distance $A_{3_n}$, n=1, 2, 3;

when min($A_{3_n}$)<-0.866 or max($A_{3_n}$)>0, considering that azimuth configuration is worse, entering the step (e), otherwise, selecting the centroids of three classification clusters to calculate a cosine distance $A_{4_n}$, n=1, 2, 3; and when max($|A_{4_n}|$)>0.5, considering that azimuth configuration is worse, and entering step (e);

(e) dividing the current airspace by a 30-degree azimuth, sequentially retrieving all regions, performing fault assumption on one of two or more BeiDou satellites that appear in a certain region but not other satellites, calculating a constellation configuration factor $SDOP_n$ (n=1, 2, . . . ) of the satellite on which the fault assumption is performed in each region, and selecting a subset excluded in the corresponding region when GDOP is minimum as a satellite subset; and (f) retrieving again, and when a visible satellite does not appear in two or more consecutive regions, not performing fault assumption on the satellites of two regions which are adjacent to a big region formed by connecting the two or more consecutive regions that have no visible satellites, and when the visible satellite appears in only the middle one of three consecutive regions, not performing fault assumption on the satellite in the middle region.

Figure 4:
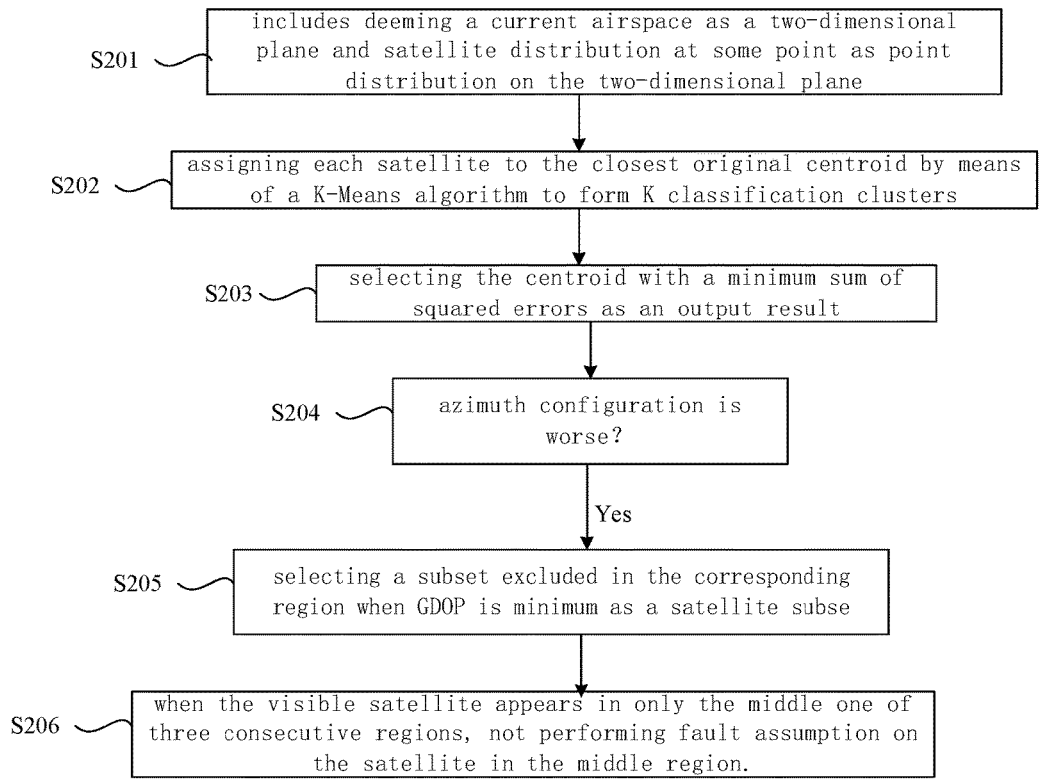
FIG. 4 illustrates a flow chart of an ARAIM subset selection method based on a BeiDou constellation according to yet another embodiment of the present invention.

FIG. 4 illustrates a flow chart of an ARAIM subset selection method based on a BeiDou constellation according to yet another embodiment of the present invention. The ARAIM subset selection method based on the BeiDou constellation comprises the following steps.

S201 includes deeming a current airspace as a two-dimensional plane and satellite distribution at some point as point distribution on the two-dimensional plane.

S202 includes selecting coordinates of K satellites as original centroids, assigning each satellite to the closest original centroid by means of a K-Means algorithm to form K classification clusters, and recalculating a centroid of each classification cluster till each cluster is unchanged or reaches a maximum iteration to obtain a centroid coordinate;

S203 includes re-selecting the coordinates of the K satellites as the original centroids, repeating the calculation step S202 to calculate the sum of squared errors of the centroid obtained every time, and selecting the centroid with a minimum sum of squared errors as an output result.

The sum of squared errors of the centroid is calculated according to the following formula:

$$SSE = \sum_{i=1}^{K} \sum_{x \in C_i} dist(c_i, x)^2,$$

wherein c is the location of the centroid, i is the serial number of the satellite, x is the location of the satellite, dist is the Euclidean distance between the location c of the centroid and the location of the satellite, and K is the number of the classification clusters.

S204 includes selecting the centroids of two classification clusters output in the step S203 to calculate a cosine distance $A_2$=cos θ.

The cosine distance between the centroids of the two classification clusters is calculated according to the following formula:

$$\cos\theta = \frac{x_1 x_2 + y_1 y_2}{\sqrt{x_1^2 + x_2^2} \sqrt{y_1^2 + y_2^2}},$$

wherein x1, y1, x2 and y2 are horizontal coordinates and vertical coordinates of the centroids of the two classification clusters in a current two-dimensional airspace plane. The same calculation method is adopted to calculate the cosine distance among the centroids of three classification clusters and the cosine distance among the centroids of four classification clusters, which will not be repeated in the embodiment.

When the cosine distance $A_2$>-0.866, it is believed that azimuth configuration is worse, S205 is entered, otherwise, the centroids of three classification clusters are selected to calculate a cosine distance $A_{3_n}$, n=1, 2, 3.

When min($A_{3_n}$)<-0.866 or max($A_{3_n}$)>0, is believed that azimuth configuration is worse, S205 is entered, otherwise, the centroids of three classification clusters are selected to calculate a cosine distance $A_{4_n}$, n=1, 2, 3.

When max($|A_{4_n}|$)>0.5, is believed that azimuth configuration is worse, and S205 is entered.

S205 includes dividing the current airspace by a 30-degree azimuth, sequentially retrieving all regions, performing fault assumption on one of two or more BeiDou satellites that appear in a certain region but not other satellites, calculating a constellation configuration factor SDOP of the satellite on which the fault assumption is performed in each region, and selecting a subset excluded in the corresponding region when GDOP is minimum as a satellite subset.

Figure 5:
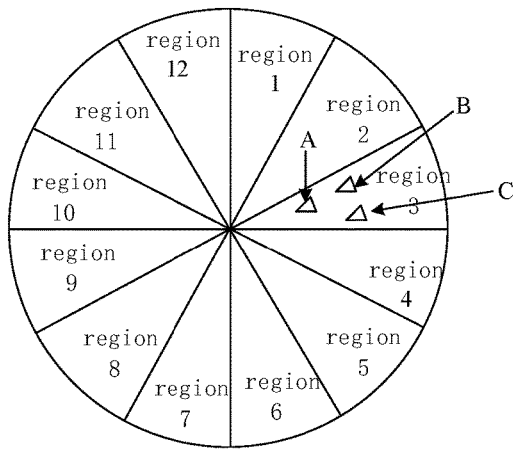
FIG. 5 illustrates a schematic view of a plurality of satellites in small regions according to yet another embodiment of the present invention.

FIG. 5 illustrates a schematic view of a plurality of satellites in small regions according to yet another embodiment of the present invention. According to the embodiment of the present invention, the current airspace is divided by a 30-degree angle. All the divided regions are sequentially retrieved. That is, a region 1, a region 2, . . . and a region 12 are sequentially retrieved. When two or more BeiDou satellites appear in a certain region (e.g., the region 3), exemplarily taking a satellite A, a satellite B and a satellite C as an example in the embodiment, fault assumption is performed on one satellite (e.g., the satellite A) in the region 3 but not other satellites (the satellite B and the satellite C) in the region 3. That is, fault assumption is only performed on the satellite A in the region 3.

A subset consisting of the satellites on which fault assumption is performed is excluded and no longer used for ARAIM availability prediction. A subset consisting of the satellites on which fault assumption is not performed is used for ARAIM availability prediction. For the regions 1-12, the constellation configuration factors $SDOP_n$(n=1, 2 . . . ) of the satellites on which fault assumption is performed in each region (e.g., the constellation configuration factor of the satellite A in the region 3) are calculated. The subset excluded in the corresponding region when a GDOP factor is minimum is selected as a satellite subset. For example, in the embodiment, if the calculated configuration factor of the region 3 is minimum, the excluded subset (the satellite B and the satellite C) in the corresponding region 3 serves as the satellite subset.

The extent to which a positioning accuracy is impacted by a relative geometrical position of a measure point to the satellite may be presented by GDOP (Geometric Dilution of Precision), which shows that the positioning accuracy will be reduced with worsening of a geometrical relationship between the satellites and is a symbol for measuring the level of the three-dimensional positioning accuracy. If different numbers of satellites participate in navigation and positioning calculation, the values of GDOP are different. The variation rule between GDOP and the number of the satellites is that GDOP is monotonically decreased with increase of the number of the satellites. Since the configuration factor $SDOP_n (n=1, 2 \ldots)$ is adopted for subset selection, the positioning accuracy may be improved when the number of the satellites is increased.

S206 includes retrieving again, and when a visible satellite does not appear in two or more consecutive regions, not performing fault assumption on the satellites of two regions which are adjacent to a big region formed by connecting the two or more consecutive regions that have no visible satellites, and when the visible satellite appears in only the middle one of three consecutive regions, not performing fault assumption on the satellite in the middle region.

Figure 6:
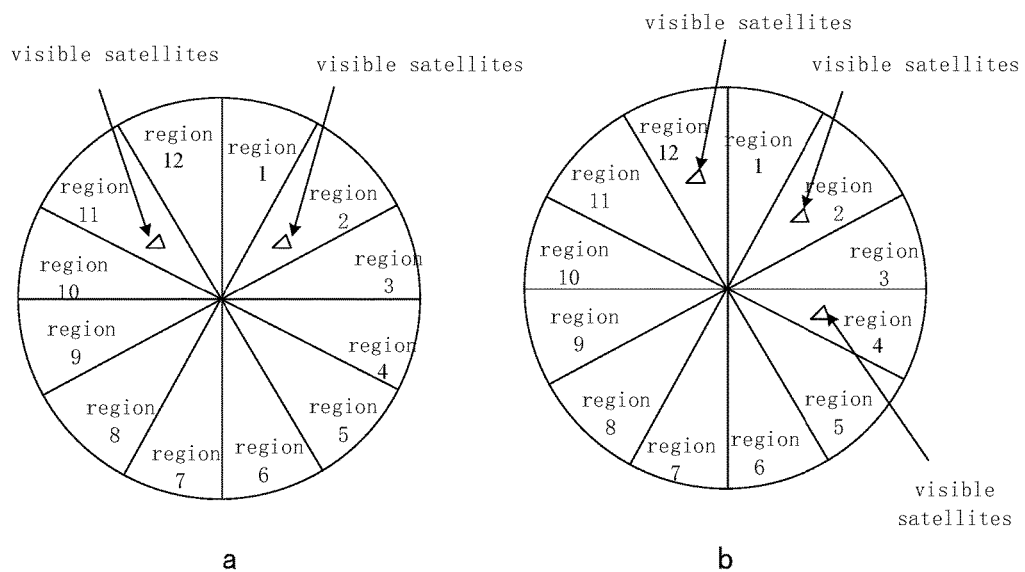
FIG. 6 illustrates a schematic view of a plurality of satellites in big regions according to yet another embodiment of the present invention.

FIG. 6 illustrates a schematic view of a plurality of satellites in big regions according to yet another embodiment of the present invention. If there is no visible satellites in two or more consecutive regions (no visible satellites in the consecutive region 12 and region 1 and no visible satellites in the consecutive regions 3-10) in FIG. 6a, fault assumption is performed on neither the satellites in two regions which are adjacent to a big region formed by connecting the region 12 with the region 1 nor the satellites in two regions which are adjacent to a big region formed by connecting the regions 3-10. That is, fault assumption is not performed on the satellite in the region 2 or the region 11.

In FIG. 6b, if a visible satellite exists in only the middle of three consecutive regions (the visible satellite exists in only the region 2 of the three consecutive regions, namely the region 1, the region 2 and the region 3), fault assumption is not performed on the satellite in the middle region. That is, fault assumption is not performed on the satellite in the region 2.

After the satellites on which fault assumption is not performed are removed, the rest satellites serve as the selected satellite subset for ARAIM analysis.

Embodiment 3

Figure 7:
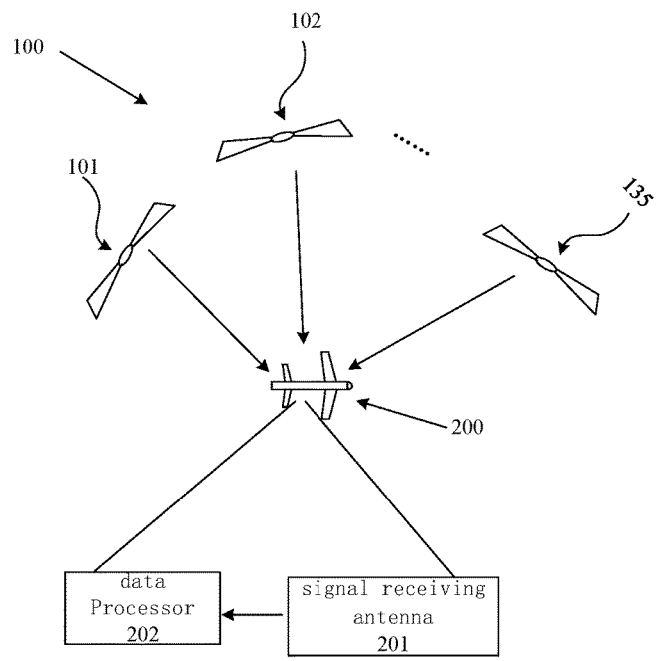
FIG. 7 illustrates a structural schematic view of an ARAIM subset selection system based on a BeiDou constellation according to yet another embodiment of the present invention.

In this embodiment, only fine modification of azimuth configuration is inspected. To make the content of the present invention more clearly explained, an ARAIM subset selection system based on a BeiDou constellation, provided by the present invention, is described. FIG. 7 illustrates a structural schematic view of an ARAIM subset selection system based on a BeiDou constellation according to yet another embodiment of the present invention. The ARAIM subset selection system based on the BeiDou constellation comprises the BeiDou constellation and an aircraft. The BeiDou constellation comprises 35 satellites. The aircraft comprises a signal receiving antenna and a data processor. The signal receiving antenna receives a signal sent by the BeiDou satellite and sends the received signal to the data processor for ARAIM subset selection according to a location coordinate of the satellite. The data processor performs subset selection by the following steps:

(a) dividing an airspace into three regions by a 30-degree elevation, and performing one-time satellite location data sampling every hour to count the average numbers L, M and H of visible satellites in a low-elevation region, a medium-elevation region and a high-elevation region within total time;

(b) subtracting the average numbers of satellites in the corresponding regions from the number of satellites, obtained through each sampling, in the three regions to obtain $L_n$, $M_n$, $H_n$, (n=1, 2, . . . ); and (c) defining an elevation configuration factor $N_{d_n}=H_n-L_n$, when $N_{d_n}>0, M_n>0$, not modifying a satellite subset; when $N_{d_n}>0, M_n<0$, not modifying the satellite subset; when $N_{d_n}<0, M_n>0$, calculating $M_n+N_{d_n}$, not modifying the satellite subset if $M_n+N_{d_n}>0$, and otherwise, modifying the satellite subset; and when $N_{d_n}<0, M_n<0$, modifying the satellite subset.

Figure 8:
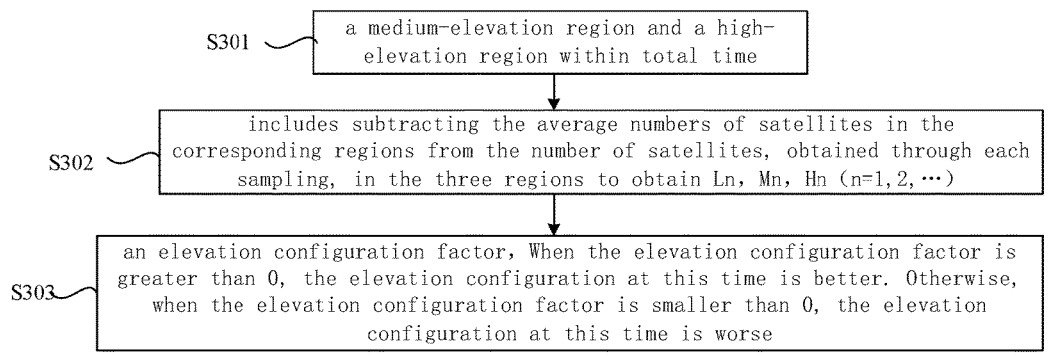
FIG. 8 illustrates a flow chart of an ARAIM subset selection method based on a BeiDou constellation according to yet another embodiment of the present invention.

FIG. 8 illustrates a flow chart of an ARAIM subset selection method based on a BeiDou constellation according to yet another embodiment of the present invention. The ARAIM subset selection method based on the BeiDou constellation comprises the following steps.

S301 includes dividing an airspace into three regions by a 30-degree elevation, and performing one-time satellite location data sampling every hour to count the average numbers L, M and H of visible satellites in a low-elevation region, a medium-elevation region and a high-elevation region within total time.

S302 includes subtracting the average numbers of satellites in the corresponding regions from the number of satellites, obtained through each sampling, in the three regions to obtain $L_n$, $M_n$, $H_n$, (n=1, 2, . . . ) which respectively represent differences between the numbers of visible satellites in the low-elevation region, the medium-elevation region and the high-elevation region at each sampling time and the average numbers of the visible satellites within total time.

S303 includes defining an elevation configuration factor $N_{d_n}=H_n-L_n$. In a satellite navigation process, a high-elevation visible satellite always has better signal coverage performance. Thus, the difference between the numbers of the satellites in the high-elevation region is positive, and the difference between numbers of the satellites in the low-elevation region is negative. In the present invention, the quality of elevation configuration sampled at single time in availability analysis is expressed by the elevation configuration factor. When the elevation configuration factor is greater than 0, the elevation configuration at this time is better. Otherwise, when the elevation configuration factor is smaller than 0, the elevation configuration at this time is worse.

When $N_{d_n}>0, M_n>0$, the satellite subset is not modified. Since the numbers of the satellites in the high-elevation region and the medium-elevation region are more than an average standard, it can be known that the elevation configuration at this time is better, and the satellite subset does not need to be modified.

When $N_{d_n}<0, M_n>0$, the satellite subset is not modified. Since the number of the satellites in the medium-elevation region at this time is smaller than the average standard, in consideration that the number of the satellites in the high-elevation region at this time is more than the average standard, it is believed that more satellites in the medium-elevation region move to the high-elevation region. Thus, the elevation configuration is still better. The satellite subset does not need to be modified.

When $N_{d_n}<0, M_n>0$, $M_n+N_{d_n}$ is calculated. If $M_n+N_{d_n}>0$, the satellite subset is not modified, otherwise, the satellite subset is modified.

When $N_{d_n}<0, M_n>0$, since there are more satellites in the medium-elevation region and the low-elevation region, it is believed that the satellites in the high-elevation region and the medium-elevation region move to the low-elevation region, and the elevation configuration becomes worse. However, if the satellites in the medium-elevation region are up to a certain number at this time, it is still believed that the elevation configuration is acceptable. Whether the subset is modified is judged through calculating $M_n+N_{d_n}$. If $M_n+N_{d_n}>0$, the satellite subset is not modified, otherwise, the satellite subset is modified.

When $N_{d_n}<0, M_n<0$, the satellite subset is modified. Since at this time, the satellites in the medium-elevation region in the description are less than the average standard and more satellites exist in the low-elevation region, it is believed that the satellites in the high-elevation region and the medium-elevation region move to the low-elevation region, and the elevation configuration is worsened a lot. Then, the subset needs to be modified.

During modification of the subset, fault assumption is not performed on the satellites in the high-elevation region. Normal fault assumption and ARAIM availability prediction are performed on the rest satellites.

After modification, when the BeiDou constellation is adopted for ARAIM analysis, redundancy or extreme assumption caused by excessively concentrated satellites may be reduced. A better constellation configuration is kept to enhance the availability.

For the first time, the present invention provides the ARAIM subset selection method applied to the BeiDou constellatio. The regions are divided in two aspects of azimuth and elevation. Some extreme assumptions that will seriously worsen the constellation configuration are not considered. Faulted subsets are removed. According to requirements of users, different methods are adopted to keep the better constellation configuration in the availability analysis process so as to improve the availability. References are provided for use of ARAIM in the Asian-Pacific region. The present invention proposes feasibility plans for applying ARAIM to the BeiDou constellation and is beneficial to development of the satellite navigation technology.

Before subset selection, the current BeiDou constellation configuration is analyzed. Choice and modification are further made during subset selection in two aspects of azimuth and elevation. The satellites not requiring fault assumption are removed, so that the impact on constellation configuration from fault assumption of the satellites is minimized. Thus, the computational load of the data processor is reduced while the availability prediction is guaranteed.

Combining the disclosed description of the present invention with practice, other embodiments of the present invention will be readily thought of and understood by those skilled in the art. The illustrations and the embodiments are merely considered to be exemplary. The true scope and spirit of the present invention are defined by the claims.

What is claimed is:

1. An Advanced Receiver Autonomous Integrity Monitoring (ARAIM) subset selection method based on a BeiDou constellation, comprising:
    (a) providing an aircraft and the BeiDou constellation, wherein the BeiDou constellation comprises 35 satellites, the aircraft comprises a signal receiving antenna and a data processor, and the signal receiving antenna is configured to receive a signal sent by one of the satellites and to send the received signal to the data processor for ARAIM subset selection;
    (b) mapping, by the data processor, a current airspace as a two-dimensional plane at a time instance, wherein a plurality of points distributed on the two-dimensional plane at the time instance reflects the satellite distributed in the current airspace;
    (c) selecting coordinates of K of the satellites as original centroids, assigning each satellite to the closest original centroid by means of a K-Means algorithm to form K classification clusters, and recalculating a centroid of each classification cluster till each cluster is unchanged or reaches a maximum iteration to obtain a centroid coordinate, wherein K is a positive integer;
    (d) re-selecting the coordinates of the K satellites as the original centroids, repeating the calculation step (c) to calculate the sum of squared errors of the centroid obtained every time, and selecting the centroid with a minimum sum of squared errors as an output result, the sum of squared errors of the centroid being calculated according to the following formula:

$$SSE = \sum_{i=1}^{K} \sum_{x \in C_i} dist(c_i, x)^2,$$

wherein c is the location of the centroid, i is the serial number of the satellite, x is the location of the satellite, dist is a Euclidean distance between the location c of the centroid and the location of the satellite, and K is the number of the classification clusters;
    (e) selecting the centroids of two classification clusters output in the step (c) to calculate a cosine distance $A_2=\cos\theta$, wherein,
    when the cosine distance $A_2>-0.866$, considering that azimuth configuration is worse, entering step (f), otherwise, selecting the centroids of three classification clusters to calculate a cosine distance $A_{3_n}$, n=1, 2, 3;
    when $\min(A_{3_n})<-0.866$ or $\max(A_{3_n})>0$, considering that azimuth configuration is worse, entering the step (e), otherwise, selecting the centroids of three classification clusters to calculate a cosine distance $A_{4_n}$, n=1, 2, 3; and
    when $\max(|A_{4_n}|)>0.5$, considering that azimuth configuration is worse, and entering step (f);
    (f) dividing the current airspace by a 30-degree azimuth, sequentially retrieving all regions, performing fault assumption on one of two or more BeiDou satellites that appear in a certain region but not other satellites, calculating a constellation configuration factor SDOPn (n=1, 2, . . . ) of the satellite on which the fault assumption is performed in each region, and selecting a subset excluded in the corresponding region when GDOP is minimum as a satellite subset; and
    (g) retrieving again, and when a visible satellite does not appear in two or more consecutive regions, not performing fault assumption on the satellites of two regions which are adjacent to a big region formed by connecting the two or more consecutive regions that have no visible satellites, and when the visible satellite appears in only the middle one of three consecutive regions, not performing fault assumption on the satellite in the middle region;

wherein the cosine distance between the centroids of the two classification clusters is calculated according to the following formula:

$$\cos\theta = \frac{x_1 x_2 + y_1 y_2}{\sqrt{x_1^2 + x_2^2}\sqrt{y_1^2 + y_2^2}},$$

wherein x1, y1, x2 and y2 are horizontal coordinates and vertical coordinates of the centroids of the two classification clusters in a current two-dimensional airspace plane.

* * * * *